April 21, 1953     O. R. OLSON     2,635,866
RADIANT TUBE PORTABLE FURNACE
Filed April 5, 1950     2 SHEETS—SHEET 1
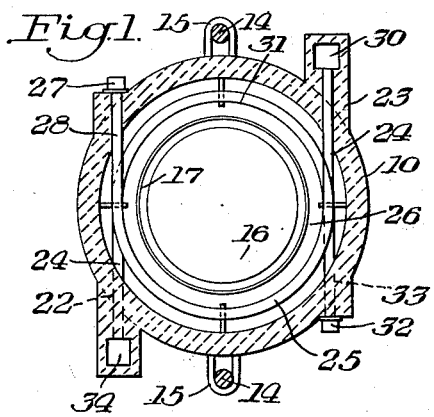
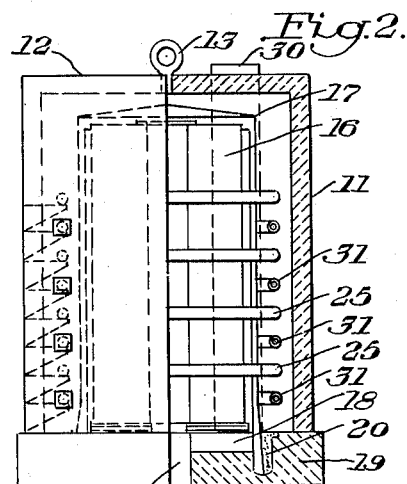
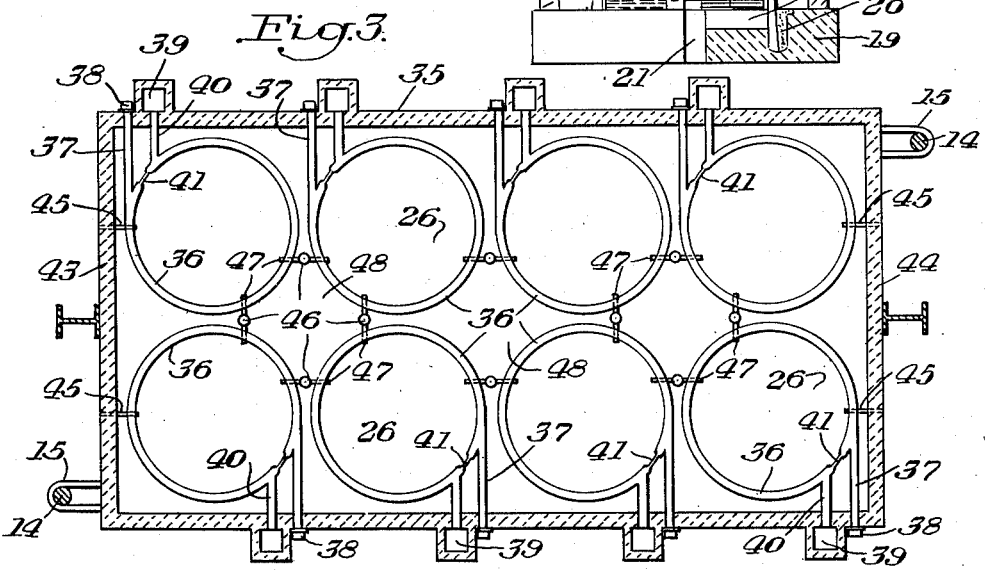
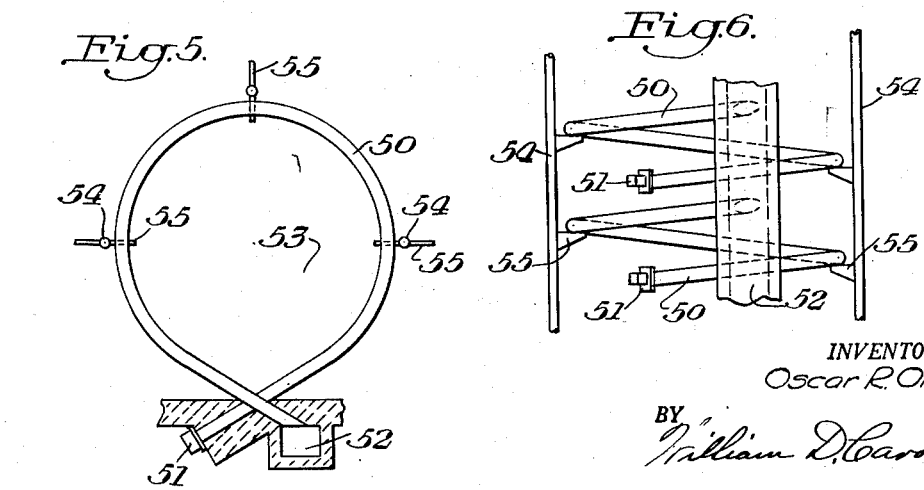
INVENTOR.
Oscar R. Olson.
BY William D. Carothers
HIS ATTORNEY April 21, 1953  O. R. OLSON  2,635,866
RADIANT TUBE PORTABLE FURNACE
Filed April 5, 1950  2 SHEETS—SHEET 2
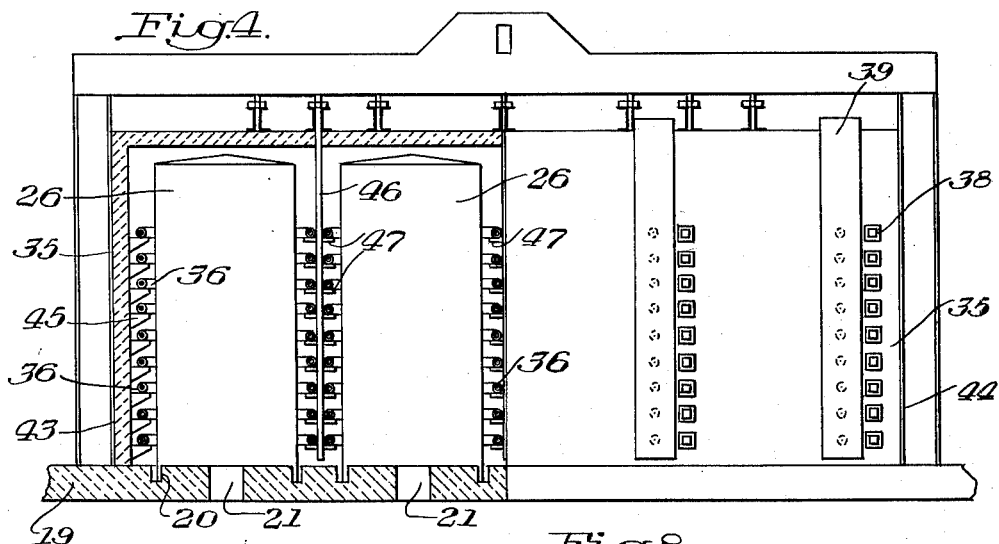
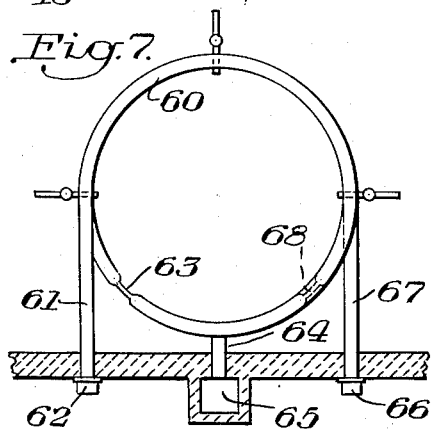
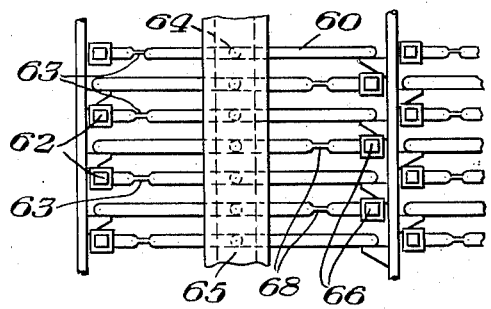
INVENTOR.
Oscar R. Olson.
BY William D. Carothers
HIS ATTORNEY Patented Apr. 21, 1953

2,635,866

UNITED STATES PATENT OFFICE 2,635,866

RADIANT TUBE PORTABLE FURNACE

Oscar R. Olson, Pittsburgh, Pa.

Application April 5, 1950, Serial No. 154,066

4 Claims. (Cl. 263—42)

This invention relates generally to heat treating furnaces and more particularly to a radiant tube portable furnace.

Radiant tube portable furnaces are cylindrical when constructed for a single cylindrical inner cover and rectangular when constructed for a series of cylindrical inner covers or a single rectangular inner cover. In some cylindrical furnaces the radiant tubes loop vertically and in the rectangular furnaces the radiant tubes may extend horizontally along the inside walls for predetermined distances and then project out through the furnace wall for connection to the burner or flue.

The radiant tube portable furnace comprising this invention provides a vertical series of tubes that are shaped to loop around the inner cover of the charge to be heat treated and, thus, form a well that is slipped down over the charge. The series of radiant tubes may be U-shaped with the legs or ends of adjacent tubes extending the same or in opposite directions. The tubes may be annular or ring shaped with inlet and outlet connections and a restriction in the ring between said connections. Again the radiant tubes may be helical with one or more turns and placed one above the other to form a well.

In each instance radiant tubes produce a well which may be slipped over the charge to be heat treated. If an inert atmosphere is required then cylindrical inner covers are sealed over the charge. The concentric series of tubes which provides the well may be supported by hangers depending from the ceiling or attached to the side walls of the portable furnace. Since a portable furnace has spaced hoops that slip down over guide posts there is no danger of interference between the tubes forming the wells and the charge set on their perspective hearth areas.

The spaced encircling tubes that form the independent wells provide a shroud of heat that is substantially uniform from top to bottom and for the full circumference of the well. The adjacent layers of tubes may be fired at points one hundred eighty degrees from each other whether from the same or opposite sides of the well to attain uniform heating.

By selectively placing the burners on alternate sides of adjacent radiant tubes or rings, the heat of the well is made more uniform as the highest temperature of each tube is not placed in the same relative position as the next adjacent tubes. This distribution increases the efficiency of operation of these furnaces by increasing the rate of heat transfer because the heat in each well is uniform throughout its length.

Another advantage of this structure resides in its construction. The tubes encircling in part or entirely the space forming the well provide one side mechanically supported when connected to the burners or flue and the other sides free to expand and contract with materially more latitude for movement than other similar types of furnaces. This is a very important structural feature as the tubes, being free to move, are less apt to develop strains causing them to fracture and fall.

Other objects and advantages appear in the following description and claims.

The accompanying drawings show, for the purpose of exemplification without limiting the invention or claims thereto, certain practical embodiments of the invention wherein:

Fig. 1 is a view in horizontal section of a portable furnace having a single radiant tube well;

Fig. 2 is a view partly in elevation and partly in section of the furnace shown in Fig. 1;

Fig. 3 is a view in horizontal section of a portable furnace having a plurality of radiant tube wells;

Fig. 4 is a view partly in elevation and partly in section of the furnace shown in Fig. 3;

Fig. 5 is a view in horizontal section showing a helically disposed radiant tube to provide a heat well in a portable furnace with parts broken away.

Fig. 6 is a view in vertical section with parts broken away showing the structure of Fig. 5;

Fig. 7 is a view in horizontal section with parts broken away and showing annular ring type radiant tubes to provide a heat well in a portable furnace;

Fig. 8 is a view in vertical section with parts broken away and showing the ring type radiant tubes of Fig. 7.

Referring particularly to Figs. 1 and 2 of the drawings the portable furnace shown therein has a single radiant tube well. Furnaces of this type are frequently referred to as a bell furnace. The furnace wall 10 is annular and is preferably constructed of ceramic material supported by a steel frame details of which are not disclosed in this application. This cylindrical furnace has the side wall 11 and the roof or top 12 which is ordinarily provided with means, such as indicated by the eye 13, for raising the furnace. Guide posts such as illustrated at 14 are provided on each side of the furnace, and the furnace has a tubular sleeve 15 arranged to slip down over guide posts 14 for the purpose of guiding the furnace in place and to insure that the furnace will not bump or otherwise engage the charge which is indicated at 16 and which is, in this instance, enclosed by the cylindrical inner cover member 17 supported on the central portion 18 of the hearth 19. An annular trough 20 surrounds the central portion 18 for the reception of the lower end of the circular annealing cover and provides a sand seal for the same. Frequently the central portion 18 of the hearth is open in the center thereof, as indicated at 21, for the purpose of inducing inert gas and causing a circulation of the same through the charge sealed within the inner cover 17.

The cylindrical wall 11 of the furnace 10 is provided with a series of supports or brackets 22 and 23 disposed on diametrically opposite sides of the cylindrical wall to receive the tube section 24 that is disposed tangentially to the annular tube members 25, all of which are axially aligned to provide the well 26.

Each tube 25 is U-shaped as shown in Fig. 1. The burner 27 is connected to the tube 25 through one leg or tangential tube 28. The U extends around the well 26 and returns through the leg or tube 29 to the flue 30. The next subjacent tube 31 would be supplied with products of combustion from the burner 32 that pass through the tangential leg section 33 and the U-shaped part of the tube 31 and will discharge through the tangential leg or tube 34, which is on the opposite side of the furnace than the flue 30. Thus, between the burner and flue connections, there is no radiant heat medium which is alternated to opposite sides of the furnace in subjacent tubes. Thus, the U-shaped tubes 25 and 31 are placed alternately with the burner and flue of each tube being positioned on opposite sides of the furnace wall 11. Nevertheless, they extend into the furnace and encircle the charge and thereby form a heat well. Since the burners of alternate tubes may be placed on the right or left-hand side of the furnace, one is enabled to employ the U-shaped radiant tube and alternate the burners in such a way that they provide a well that is uniformly heated from the top to the bottom thereof.

It will be noticed that the spacing of the tubes 31 and 25 are closer together at the bottom of the well 26 than at the top thereof, and a portion of the upper end of the well is not provided with tubes as this section has the sufficient heat to properly heat treat the steel charge. As shown in Fig. 2, the lowermost tube 31 may have the burner on the right-hand side as viewed in this figure, whereas the next tube 25 has its burner at a diametrically opposite position on the opposite side of the furnace. Owing to the fact that the vertical portion of the flues 30 and 34 are spaced from the cylindrical wall 11 of the furnace ample room is provided for the insertion of the burner between the flues and the furnace wall.

Referring now to Figs. 3 and 4, it will be noted that a plurality of heat wells 26 are provided in a single portable furnace 35. However, each of the wells 26 is formed as a tube constructed somewhat differently than that shown in the other figures. Each of the tubes 36 shown in Figs. 3 and 4 is constructed to be completely annular or ring-shaped and is provided with a tangential pipe 37 leading from the burners 38 which is positioned adjacent a flue 39 that is connected to the same annular ring 36 by means of the tubes 40. Thus, the burning fuel is discharged from the burner through the tangential pipes 37 and travels around the annular ring or tube 36 until it comes to that point where the tube 40 is connected thereto. Between the connecting points of the burner and flue each annular tube is provided with a restriction 41 which permits a certain portion of the products to recirculate in the ring on annular tube 36. However, a majority of the products will reverse their flow and travel out the connecting tube 40 to the flue 39 where they pass off from the furnace.

As shown in Fig. 4 the ring tubes 36 are mounted closer together adjacent the bottom of the well 26 than they are adjacent to the top of the well, and this particular portable furnace is provided with eight wells.

As shown in Figs. 3 and 4 the side walls 43 and 44 of the furnace are provided with hanger members 45 which support the adjacent portion of each of the tubes 36. These supports merely carry the load of the tube but permit the tube to slide thereover when expanding and contracting due to the change in temperatures of the same. In order to support each of the tubes in the space between adjacent wells, a hanger member 46 is suspended from the roof and is provided with series of oppositely extending arms or brackets 47. These arms extend outwardly and support each of the tubes 36 from the bottom to the top of the respective heat wells and maintain the close spacing adjacent at the bottom of the wells and the wider spacing adjacent to the top of the wells.

The portable furnace 35 is likewise provided with the sleeves 15 which extend around the posts 14 at diametrically opposite positions in the furnace for guiding it over the charges on the hearth.

It should also be noted in Fig. 3 that the burners 38 and the flue ports 40 for each tube are closely adjacent to each other. On one side of the furnace in Fig. 3 the burners are all connected on the left side of the tubes whereas on the other side of the furnace the burners are all connected on the right of the tubes. This arrangement of the burners provides more even distribution of heat within the furnace generally. If the tubes connected to the burners of adjacent wells were permitted to enter the furnace adjacent to each other, a concentrated heat would occur between adjacent wells. By the arrangement shown a more uniform distribution of heat is provided, not only in each well, but also in the heat as affecting adjacent wells. If the wells are clustered at greater distances they may produce additional wells in which additional charges may be set. This may be in the shape of a quadrangle with a center charge, the center charge being heated by the tubes of each of the wells forming the quadrangle with the center well being indicated at 48.

In the structure shown at Figs. 5 and 6 the radiant tubes 50 are supplied from the burners 51 and the burning fuel is forced through the tube tangentially, entering the tube encircling the same and is discharged tangentially to the flue 52. When the radiant tube connections for the introduction of the burning fuel crosses the discharge end of the tube they are required to be at different elevations and, thus, the encircling tube is formed in a helix such as illustrated in Fig. 6. Each helical section 50 is placed coaxially with subjacent sections to provide the heat well 53, and each tube is supported by the hanger members 54 having their cross members 55 that extend under the adjacent portion of the tubes and support the same. These hangers will, of course, be suspended from the roof as illustrated in Fig. 4. Each of the tubes 50 does not require a support adjacent to the furnace wall as the connecting portion of the tube is supported by the wall, itself.

In the structure shown in Figs. 7 and 8, each tube 60 provides an annular ring that is connected by the tangential section 61 from the burner 62. The burning fuel passes through the tube 61 into the annular ring 60 and therearound to the restriction 63, which is positioned intermediately the tangential connection 61 and the flue connections 64. The latter pass through the furnace wall to the single flue 65. The next adjacent annular tube 60 will have its burner 66 connected by means of the tangential section 67 to the ring or annular radiant tube and the burning fuel will travel in a counterclockwise direction to the restriction 68. However, the discharge will be to the same flue 65, in this way the burners 62 and 66 are spaced from one another although the tubes connected thereto are served by the same flue. In each instance the products of combustion are tangentially directed into a radiant tube which encircles a space, and in view of the fact that the subjacent tubes are all coaxially in line they form a heat well that may be inserted down over a charge supported on the hearth. The fact that in each instance the portable furnace is guided when set in position and, each well has proper clearance between the charge and the tubes forming the well, there will be no interference between the charge and the furnace.

As shown in Figs. 3 and 7 the radiant tubes are completely annular and have a restriction formed therein to prevent full recirculation of the products of combustion or a short circuit of the products of combustion owing to the fact that the products are inserted tangentially of the rings. In other instances the burning fuel is inserted into the tube tangentially and leaves the tube tangentially without recirculation. The distribution of the heat in the furnace may be made substantially the same in each instance owing to the control of the burning fuel. Fuels of different character such as solid, liquid or gas may be employed in portable furnaces of this construction.

I claim:

1. A heat treating furnace comprising a cover, a vertical series of tubular heat exchange rings in said cover, the bore of each tubular ring providing an endless circular path, a heat inlet leg extending from the exterior of the cover to the bore of each tubular ring to introduce heat thereto, an exhaust leg connected to the bore of each tubular ring in spaced relation to said inlet leg to remove the circulated heat therefrom, a portion of the heat recirculating through the bore of each tubular ring by flowing through said endless circular path extending from the exhaust leg connection to join the newly introduced heat at the inlet leg connection.

2. The structure of claim 1 characterized by that portion of the bore of the tubular ring between the exhaust leg connection and the inlet leg connection, in the direction of the flow of the heat, is provided with a restriction to limit the amount of heat recirculating through the tubular ring and joining the newly introduced heat.

3. The structure of claim 1 characterized in that said inlet leg is connected tangentially to one side of the tubular ring.

4. The structure of claim 1 characterized in that said exhaust leg connection is angular to the bore of said tubular ring requiring the exhaust heat to change the course of its normal flow around said endless path through the tubular ring.

OSCAR R. OLSON.

References Cited in the file of this patent

UNITED STATES PATENTS

| Number | Name | Date |
| --- | --- | --- |
| 1,427,319 | Peacock | Aug. 29, 1922 |
| 2,041,312 | Winder et al. | May 19, 1936 |
| 2,041,341 | Hepburn | May 19, 1936 |
| 2,051,099 | Munford | Aug. 18, 1936 |
| 2,171,777 | Woodson | Sept. 5, 1939 |
| 2,293,813 | Fisher | Aug. 25, 1942 |